May 12, 1970 — D. E. GUNLOCK — 3,511,535
ADJUSTABLE HEADREST SUPPORT ASSEMBLY
Filed April 24, 1968 — 2 Sheets-Sheet 1
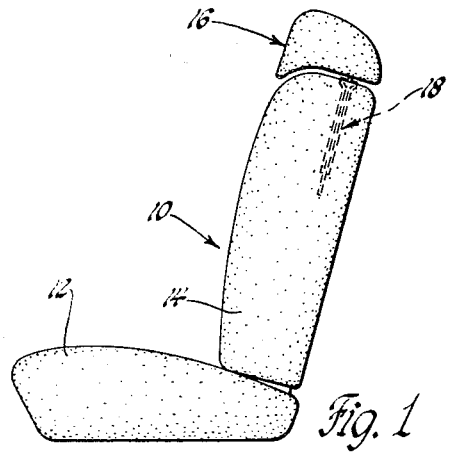
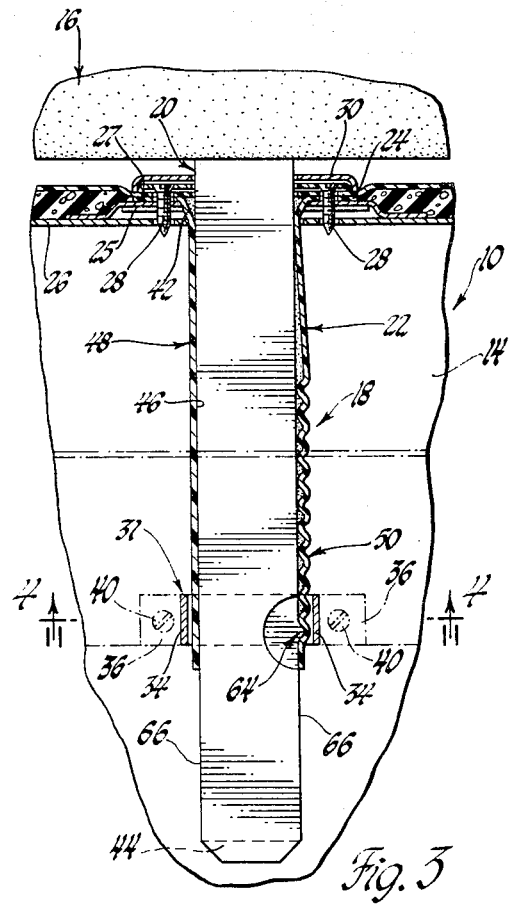
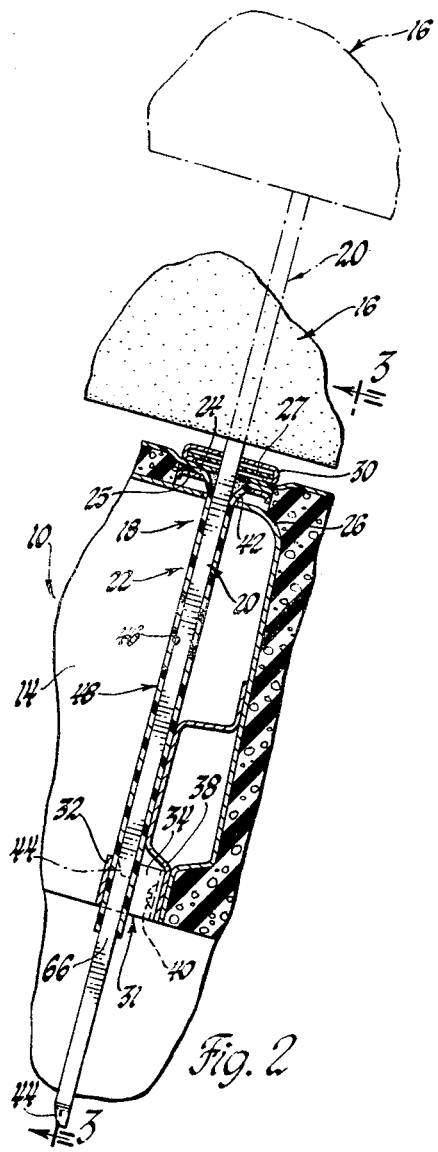
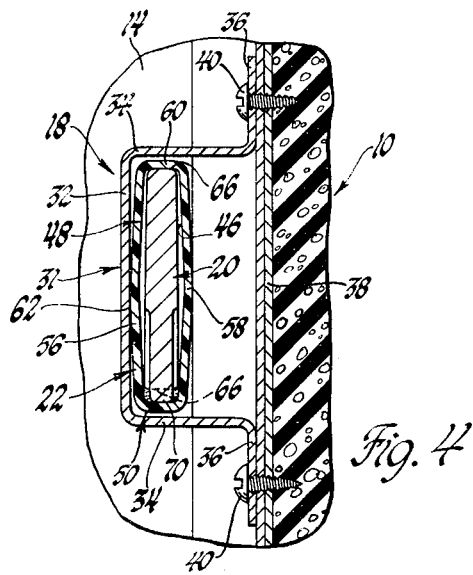
INVENTOR.
Donald E. Gunlock
BY
E. J. Biskup
ATTORNEY May 12, 1970  D. E. GUNLOCK  3,511,535

ADJUSTABLE HEADREST SUPPORT ASSEMBLY

Filed April 24, 1968  2 Sheets-Sheet 2

INVENTOR
Donald E. Gunlock
BY
E. J. Biskup
ATTORNEY

United States Patent Office 3,511,535
Patented May 12, 1970

3,511,535
ADJUSTABLE HEADREST SUPPORT ASSEMBLY
Donald E. Gunlock, Birmingham, Mich., assignor to General Motors Corporation, Detroit, Mich., a corporation of Delaware
Filed Apr. 24, 1968, Ser. No. 723,816
Int. Cl. A47c 7/36
U.S. Cl. 297—410                                      4 Claims

ABSTRACT OF THE DISCLOSURE

An adjustable headrest assembly characterized by having a flexible plastic support sleeve mounted interiorly of a seat back for adjustably and telescopically receiving the attached support bar of an associated headrest. A projection formed along one side of the support bar is selectively movable between longitudinally spaced corrugations formed on an inner surface of the support sleeve. The sleeve is formed so that it elastically flexes outwardly as the projection is detented over the alternate ridges of the corrugations.

---

Headrests are becoming increasingly popular with motor vehicle owners as an aid for increasing seating comfort and reducing driving fatigue. To fully realize the beneficial aspects of a headrest, an adjusting arrangement for the headrest height should be provided so that individuals having differing heights and seating preferences can select a headrest position that is best suited to their individual needs. While many adjusting arrangements have been proposed in the prior art, a multiplicity of parts have been required to achieve the design objective of vertical adjustability. The foremost requirement is that the headrest support member be vertically extensible with respect to the seat back. This feature is most easily obtained by telescoping the headrest support member within a complementally formed metal casing mounted interiorly of the seat back. This basic structure must then be provided with independent adjusting means to provide the desired selective vertically adjustability. The adjusting means may take various forms such as manually operable thumb screws, spring biased balls engaging spherical depressions or cantilevered springs engaging notches in the support member. It will be appreciated that all of these arrangements are costly to manufacture because they require additional parts, forming operations, and assembly techniques which are additive to those required for the basic structure.

The present invention, in preferred form, contemplates a simplified assembly which requires only two basic components, namely, a support sleeve and a headrest support bar. The support sleeve can be molded from a plastic material and has a plurality of corrugations formed along one interiorly facing longitudinal surface. An outwardly facing projection is formed on the support bar and is selectively detented between successive ridges of the corrugations to provide varying headrest positions. The support sleeve is designed to elastically expand laterally to accommodate passage of the projection over the alternate ridges of the corrugations. After the headrest is positioned at the desired height, the internal elastic forces of the plastic material will restore the support sleeve to its molded shape and thereby securely lock the projection between the alternate ridges.

Accordingly, the objects of the present invention are: to provide adjustability for a motor vehicle headrest by integrally forming cooperating adjusting means in the headrest support bar and associated support sleeve; to provide a selectively extensible headrest assembly for a motor vehicle seating unit wherein a flexible support sleeve telescopically receives a headrest support bar and associated headrest, the support bar and support sleeve having cooperating detent means formed therein for establishing a plurality of vertical headrest positions; to provide an adjustable headrest wherein a plastic support sleeve mounted interiorly of the seat back telescopically and extensibly receives the support bar of the headrest, the support bar having an outwardly facing projection formed thereon that is selectively engageable with a plurality of longitudinally spaced corrugations formed at the side of the support sleeve in a manner that permits the headrest to be selectively positioned at a plurality of vertical heights; and to provide vertical adjustability for a motor vehicle headrest of the type using a telescoping support sleeve wherein the support bar has a projection formed thereon that is engageable between alternate ridges of a corrugated seam formed on an interiorly facing surface of the support sleeve, the latter being designed to elastically flex laterally as the support bar is telescoped therewithin and thereby accommodate passage of the projection over the ridges as the headrest is moved to the desired vertical position.

These and other objects will be apparent to one skilled in the art upon reading the following detailed description, reference being made to the accompanying drawings in which:

FIG. 1 is a side elevational view of a motor vehicle seating unit incorporating an adjustable headrest assembly made in accordance with the present invention;

FIG. 2 is an enlarged fragmentary side cross-sectional view of the adjustable headrest assembly of FIG. 1 showing of the headrest in the lower retracted position and the upper head restraining position;

FIG. 3 is a view taken along line 3—3 in FIG. 2;

FIG. 4 is an enlarged view taken along line 4—4 of FIG. 3;

Figure 5:
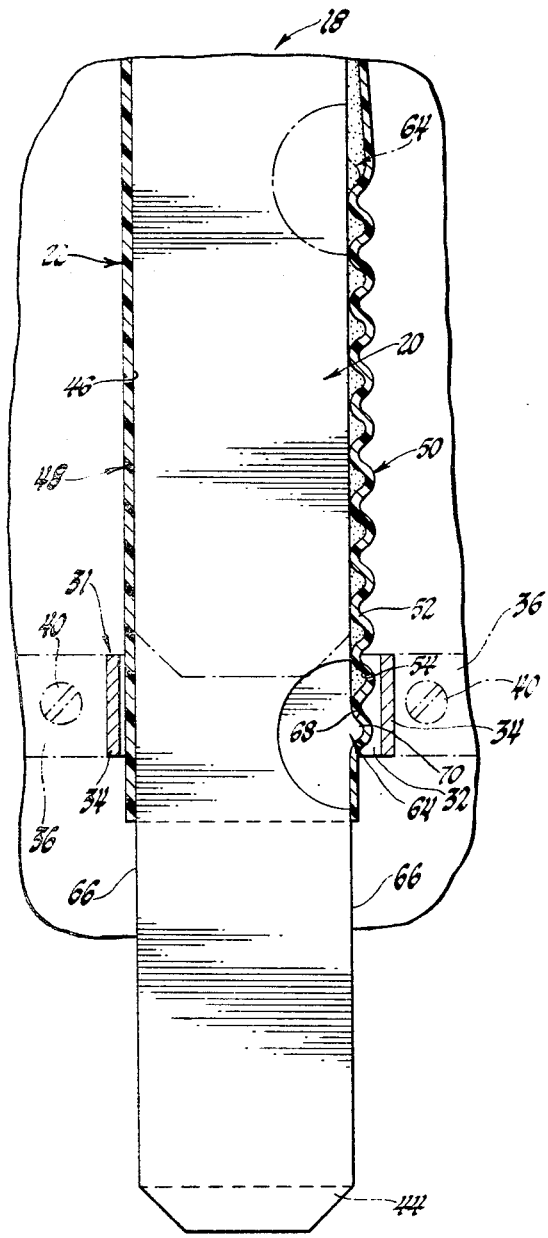
FIG. 5 is an enlarged fragmentary cross-sectional view of the headrest support sleeve and support bar made according to the present invention.

Referring to FIG. 1, there is shown a conventional motor vehicle seating unit 10 comprising a seat cushion 12 and a rearwardly located, upwardly extending seat back 14. A headrest 16, having a resilient internal padding and a contoured outer covering, is mounted at the top of the seat back 14 by an adjustable headrest assembly, generally indicated by the reference numeral 18. Referring now to FIG. 2, the headrest 16 is fixedly mounted to the upper end of an elongated metal support bar 20 which has a lower portion slidably and telescopically received within an elongated elastic support sleeve 22. In the preferred form, the support sleeve 22 is injection molded from a plastic material such as polypropylene, and it has been found that a uniform wall thickness of .060 inch will provide the desired physical properties for the function to be explained in detail below.

As shown in FIG. 3, the upper end of the support sleeve 22 has a rectangular flange 24 compressively retained interior of the seat back 14 between a retainer bracket 25, which is spot welded to the upper frame member 26, and a clamping plate 27 by self-tapping screws 28 or other suitable fasteners. A retaining cap 30 is pressed over the clamping plate 27 to ornamentally cover the point of attachment. The lower end of the support sleeve 22 is held in position by a generally U-shaped retaining strap 31 which includes a transverse base section 32 frontally engaging the support sleeve 22 and laterally spaced rearwardly extending legs 34 terminating at outwardly turned arms 36 that are attached to a cross frame member 38 of the seat back 14 by screws 40. As shown in FIGS. 3 and 4, the legs 34 are laterally spaced from the support sleeve 22 so that the latter can elastically flex and laterally expand in a manner to be subsequently described as the support bar 20 telescopes therewithin.

The support sleeve 22 has a generally rectangular cross section and includes the previously described flange 24 that connects with an inwardly downwardly tapering portion 42 adapted to guide a beveled tip portion 44 of the support bar 20 into an elongated sleeve cavity 46 formed in a longitudinally downwardly extending casing or guide portion 48. One lateral side of the guide portion 48 is provided with a corrugated seam, generally indicated by the reference numeral 50. As shown more clearly in FIG. 5, the seam 50 is defined by a series of alternately spaced semicircular ridges 52 and grooves 54. As seen in FIG. 4, the guide portion 48 also includes longitudinally spaced transversely extending forward and rearward walls 56 and 58, respectively, which are molded with a slight draft angle and taper inwardly to the corrugated seam 50 and opposing longitudinal seam 60 from a longitudinal parting line 62.

Figure 7:
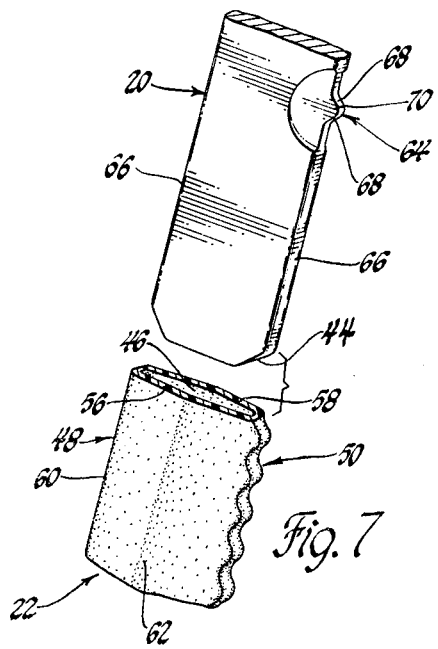
FIG. 7 is a perspective view showing portions of the support sleeve and support bar.

As shown in FIG. 7, the support bar 20 has an outwardly facing triangular projection 64 formed along one of the lateral surfaces 66. The projection 64 is defined by converging inclined edges 68 and a rounded tip portion 70, and while the projection 64 may be formed by a variety of methods, an upsetting operation has been found to be the most convenient.

Figure 6:
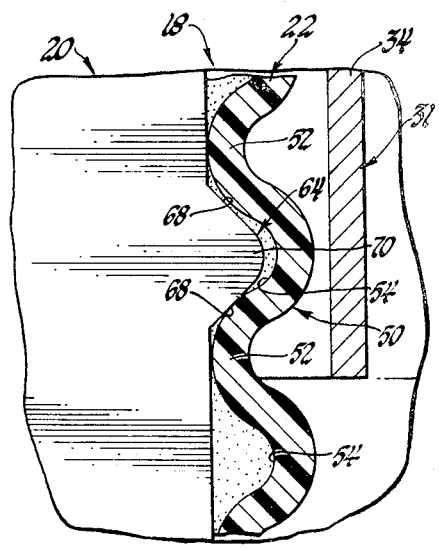
FIG. 6 is an enlarged fragmentary cross-sectional view showing the engagement of the projection formed on the headrest support bar with the corrugated seam formed at the side of the support sleeve.

As shown in greater detail in FIGS. 5 and 6, the headrest 16 is in a locked position whenever the edges 68 of the projection 64 engage the side portions of the successive ridges 52 and the tip portion 70 projects into one of the grooves 54. The support sleeve 22, in this position, is essentially in the molded free-form shape and the seams 50 and 60 slidingly engage the lateral surfaces 66 so that the support bar 20 is telescopically and extensibly supported by the casing or guide portion 48. When it is desired to move the headrest 16 between the lower retracted position shown by the solid lines in FIG. 2 and the upper head restraining position illustrated by phantom lines, the seat occupant grasps the headrest 16 and moves the latter either upwardly or downwardly to the desired position. As the support bar 20 is moved, the edges 68 of projection 64 slide over the peaks of ridges 52, and the walls 56 and 58 of the casing 48 elastically flex inwardly thereby causing the seams 50 and 60 to be laterally expanded to accommodate this movement. After the tip portion 70 passes over the innermost portion of ridge 52, the internal elastic forces of the plastic support sleeve material restore the casing 48 to the molded shape and urge the projection 64 downwardly to a locked position between the succeeding alternate ridges 52. It has been found that a 2° molded draft angle, under the parameters previously discussed, will give the casing 48 sufficient lateral flexibility to accommodate a support bar 20 having a projection 64 of approximately 0.36 inch for a .025 x 1.50 inch sleeve cavity 46.

As should be apparent, the support sleeve can take other forms within the scope of the invention and achieve the function described above. For example, the mold parting line can be placed along the seams 50 and 60. Inasmuch as this technique will reduce or eliminate the molded draft angle, other provisions may be necessary to achieve the desired lateral flexibility, and in this connection, it has been found that one or more longitudinal slits along one or both of the sides 56 or 58 will provide the desired elastic flexing. Also, the corrugated seam 50 can be designed to elastically deform to accommodate the telescopic movement of the support bar 20.

While the preferred embodiment has been described with reference to a rectangular support bar 20 and support sleeve 22, it will be appreciated that varying geometrical cross sections can be effectively utilized. Additionally, the corrugated seam 50 and the projection 64 obviously can be replaced with functional equivalents as described above without departing from the inventive concept disclosed.

What is claimed is:

1. An adjustable headrest assembly for use with a seating unit including a seat cushion and seat back, comprising: an elongated support member; a headrest mounted on the upper end of the support member; an elongated elastic sleeve member formed of a flexible material telescopically and slidingly receiving the support member for bidirectional movement therewithin; means associated with the sleeve member for securing the latter to the seat back in assembly relation; a plurality of substantially uniformly spaced alternate ridges formed integrally on an inner surface of said sleeve member; a projection rigidly formed on the support member selectively engageable between opposed edges of successive ridges and adapted to elastically flex the sleeve member and outwardly deflect said inner surface to accommodate telescopic movement of said projection over said ridges thereby providing a plurality of adjusted headrest positions relative to said seat back.

2. An adjustable headrest assembly for use with a seating unit including a seat cushion and seat back, comprising: an elongated support member; a headrest mounted on the upper end of the support member; an elongated elastic sleeve member formed of a flexible material telescopically and slidingly receiving the support member for bidirectional movement therewithin; a plurality of substantially uniformly longitudinally spaced alternate ridges and grooves formed on an inner surface of said sleeve member; means associated with the sleeve member for securing the latter to the seat back in assembly relation; a projection rigidly formed on the support member selectively detented within said grooves between said ridges and adapted to elastically outwardly flex said inner surface as said support member is telescopically moved therewithin, said ridges and grooves having sufficient longitudinal extent to permit selective telescopic movement of said support member relative to said seat back between a lower retracted position wherein said headrest is adjacent said seat back and a raised position wherein said headrest is in an upper head restraining position.

3. An adjustable headrest assembly for use in a motor vehicle having a seating unit including a seat cushion and seat back, comprising: an elongated elastic sleeve member adapted to be secured to the seat back, said sleeve member having a casing slidingly and telescopically receiving an elongated support member for bidirectional movement therewithin; a headrest mounted on the upper end of said support member; longitudinally extending corrugations defined by a series of alternately uniformly spaced ridges and grooves formed along an inner surface of the casing; a projection rigidly formed on the support member adapted to be selectively detented into locked engagement with said corrugations between successive ridges and causing yielding outward deflection of the ridges and elastic flexure of the casing to accommodate telescopic movement of the support member to a plurality of adjusted positions.

4. An adjustable headrest assembly for use in a motor vehicle having a seating unit including a seat cushion and seat back, comprising: an elongated elastic sleeve member adapted to be secured to the seat back, said sleeve member including a casing having a rectangular longitudinally extending cavity formed therein defined by laterally spaced walls and laterally extending walls, said second-mentioned walls adapted to elastically flex to accommodate lateral spreading of the first-mentioned walls; and elongated rectangular support member having a headrest mounted on an upper end portion thereof, said support member having a lower end portion telescopically received with the cavity and bidirectionally slidably supported by said casing; longitudinally extending corrugations formed along an inner surface of one of said first-mentioned walls; a projection rigidly formed on the support member adapted to be selectively detented into locked engagement with said corrugations and causing yielding outward lateral spreading of said first-mentioned walls and elastic flexing of the second-mentioned walls to accommodate telescopic movement of the support member to a plurality of adjusted positions.

References Cited

UNITED STATES PATENTS

| | | | |
|---|---|---|---|
| 2,995,983 | 8/1961 | Davis | 248—160 X |
| 3,063,751 | 11/1962 | Hatch | 297—410 |
| 3,077,251 | 2/1963 | Fraylick et al. | 85—5 X |
| 3,287,063 | 11/1966 | Nicholas | 297—388 |
| 3,307,874 | 3/1967 | Wilson | 297—410 |

CASMIR A. NUNBERG, Primary Examiner

U.S. Cl. X.R.

248—161

PO-1050
(5/69)

UNITED STATES PATENT OFFICE
CERTIFICATE OF CORRECTION

Patent No. 3,511,535            Dated May 12, 1970

Inventor(s) Donald E. Gunlock

It is certified that error appears in the above-identified patent and that said Letters Patent are hereby corrected as shown below:

Column 2, line 17, reading "support sleeve wherein" should read -- support bar and an elastic support sleeve wherein --; line 35 reading "showing of the headrest" should read -- showing the headrest --.

SIGNED AND
SEALED
SEP 1 - 1970

(SEAL)
Attest:

Edward M. Fletcher, Jr.
Attesting Officer

WILLIAM E. SCHUYLER, JR.
Commissioner of Patents